United States Patent [19]

Ireland et al.

[11] Patent Number: 5,211,868

[45] Date of Patent: May 18, 1993

[54] DIHYDROGEN ORTHOPHOSPHATE DEICING COMPOSITION

[75] Inventors: Donald T. Ireland, Delano; Nancy L. Lucas, Minneapolis, both of Minn.

[73] Assignee: Cargill, Incorporated, Minneapolis, Minn.

[21] Appl. No.: 748,000

[22] Filed: Aug. 21, 1991

Related U.S. Application Data

[63] Continuation-in-part of Ser. No. 572,174, Aug. 23, 1990, abandoned.

[51] Int. Cl.⁵ .................................................. C09K 3/18
[52] U.S. Cl. ................................. 252/70; 252/8.555; 422/7
[58] Field of Search ............................................. 252/70

[56] References Cited

U.S. PATENT DOCUMENTS

| | | | |
|---|---|---|---|
| 3,537,900 | 11/1970 | Halbert | 134/42 |
| 3,623,992 | 11/1971 | Kolasinski | 252/182.32 |
| 3,772,202 | 11/1973 | Neitzel et al. | 252/70 |
| 3,833,504 | 9/1974 | Neitzel et al. | 252/70 |
| 4,134,959 | 1/1979 | Menke et al. | 422/16 |
| 4,202,796 | 5/1980 | Jacob et al. | 252/389 A |
| 4,358,389 | 11/1982 | König-Lumar et al. | 252/70 |
| 4,803,007 | 2/1989 | Garber | 252/70 |
| 4,869,841 | 9/1989 | Matteodo et al. | 252/79 |
| 4,938,891 | 7/1990 | Lenack et al. | 252/49.3 |
| 4,978,500 | 12/1990 | Murray | 422/7 |

FOREIGN PATENT DOCUMENTS

| | | |
|---|---|---|
| 180568 | 5/1986 | European Pat. Off. . |
| 3028372 | 2/1982 | Fed. Rep. of Germany . |
| 156918 | 9/1982 | Fed. Rep. of Germany . |
| 3208219 | 9/1983 | Fed. Rep. of Germany . |
| 3229654 | 1/1984 | Fed. Rep. of Germany . |
| 49-3853 | 1/1974 | Japan . |
| 58-042773 | 3/1983 | Japan . |
| 60-195178 | 10/1985 | Japan . |
| 63-117089 | 5/1988 | Japan . |
| 63-225686 | 9/1988 | Japan . |
| 482488 | 6/1977 | U.S.S.R. . |
| 1249057A | 8/1984 | U.S.S.R. . |

*Primary Examiner*—Asok Pal
*Assistant Examiner*—P. Achutamurthy
*Attorney, Agent, or Firm*—Fitch, Even, Tabin & Flannery

[57] ABSTRACT

A deicing composition which includes NaCl, a water soluble magnesium salt and a water soluble dihydrogen orthophosphate is described. A method for deicing utilizing the composition also is described.

16 Claims, No Drawings

DIHYDROGEN ORTHOPHOSPHATE DEICING COMPOSITION

FIELD OF THE INVENTION

This Application is a Continuation-in-Part Application of Ser. No. 572,174 filed on Aug. 23, 1990, now abandoned.

The present invention is directed to a deicing composition and a method for utilizing the deicing composition. More particularly, the present invention is directed to a deicing composition which comprises a water soluble dihydrogen orthophosphate, a water soluble magnesium salt and the deicer salt NaCl.

BACKGROUND OF THE INVENTION

Calcium chloride and alkali metal salts, such as sodium chloride, are extensively used in very large quantities on the roads of many countries for snow and ice removal. The use of calcium chloride or sodium chloride has, however, met with some resistance due to their corrosive effect on ferrous metal and deleterious effect on concrete. Indeed data has been released suggesting that the cost of the damage associated with the widespread application of salt is approximately fourteen times the direct cost associated with the application of the salt; D. M. Murray, et al., *An Economic Analysis of the Environmental Impact of Highway Deicing*, U.S. Environmental Protection Agency, Cincinnati, Oh, EPA-600/A-76-105 (May 1976). Accordingly, it would be highly desirable to provide a deicing composition which deices rapidly, has a reduced level of concrete damage such as by scaling the surface of the concrete, and reduces corrosion of ferrous metallic objects.

Various additives have been proposed for mixing with salt to aid in inhibiting corrosion caused by the salt. British Patent No. 1328509 to Bishop et al. describes a composition suitable for use in the inhibition of corrosion caused by salt, which includes a water-soluble polyphosphate and a surface active agent. The surface active agent is various amine compounds. In an article by E. E. Steed, *Road Research Laboratory*. Ministry of Transport, Report LR268-1969, polymetaphosphate inhibitors which require the presence of calcium ions are described to be effective as a corrosion inhibitor for brine solutions.

There is a serious need to provide a low cost deicing composition which reduces oxidative corrosion caused by aqueous solutions of NaCl. Depending on cost, a deicing composition which reduces such corrosion or rust would be highly desirable for use on roadways where large quantities of the deicing composition are required. The present invention is directed to providing a corrosion resistant, low cost, deicing composition which is suitable for highway and sidewalk use.

Accordingly, one of the principle objects of the invention is to provide a deicing composition which deices rapidly. Another object of this invention is to provide a deicing composition which causes a reduced level of corrosion to ferrous metal. Yet another important object of this invention is to provide a deicing composition which utilizes NaCl as a cost effective deicer, but reduce the highly corrosive effect of NaCl on ferrous metal.

These and other objects of the invention will become apparent from the following description.

SUMMARY OF THE INVENTION

Orthophosphates tend to form slightly soluble compounds with divalent metal ions and may not be expected to perform well together as corrosion inhibiting compositions. Surprisingly, this invention combines NaCl, a water soluble magnesium salt such as $MgCl_2$ or $MgSO_4$ and the water soluble dihydrogen orthophosphates selected from the group consisting of $NaH_2PO_4$, $KH_2PO_4$ or $NH_4pl\ H_2PO_4$, which may be in the hydrated form, to produce an effective anticorrosive/antiscaling deicer composition which provides new and unexpected anticorrosive activity over other deicing compositions.

The present invention is directed to a non liquid or dry deicing composition comprising NaCl as a deicer salt in an amount effective for deicing a surface with frozen water thereon, a water soluble magnesium salt such as $MgCl_2$ or $MgSO_4$ or their hydrates and an amount of water soluble dihydrogen orthophosphate selected from the group consisting of $NaH_2PO_4$, $KH_2PO_4$, $(NH_4)H_2PO_4$, and mixtures thereof effective of the reduction of corrosion of ferrous metal by aqueous solutions of NaCl. This deicing composition of the invention provides for reduced corrosion of ferrous metal; and except for the ammonium ortho-phosphate, reduces the scaling that NaCl causes on concrete.

The present invention is also directed to a method for deicing a surface having frozen water thereon by applying the deicing composition of the invention onto the surface of the ice.

DETAILED DESCRIPTION OF THE INVENTION

As used herein "water soluble dihydrogen orthophosphate" means orthophosphates selected from the group consisting of sodium dihydrogen phosphate $NaH_2PO_4$, potassium dihydrogen phosphate $KH_2PO_4$, $(NH_4)H_2PO_4$ and mixtures thereof. These orthophosphates may be in their hydrated form, such as where there generally will be from about 1 to about 2 waters of hydration.

As used herein ferrous metal means iron or alloys of iron including steel which undergo corrosion or oxidation under ambient conditions.

As used herein, water soluble salt means a water solubility of at least about 10 g/l at 30° C.

According to the invention, the water soluble dihydrogen orthophosphate used in combination with the water soluble magnesium salt and the NaCl reduces the corrosive effect on ferrous metal that is usually associated with aqueous solutions of NaCl.

The effective ratio of the water soluble orthophosphate to a deicer salt can vary widely. The deicing composition of the invention contains at least about 1.0 weight %, and preferably from about 2 to about 10 weight %, based upon the weight of the deicing composition on a dry basis, of water soluble dihydrogen orthophosphate in combination with about 90 weight percent and preferably from about 90% to about 98 weight based upon the weight of the composition on a dry basis, of NaCl. Due to its low cost, sodium chloride is in the major amount of the deicing composition, such as about 95 weight percent of the deicing composition, with the water soluble dihydrogen orthophosphate being present in an amount effective to reduce the rate of corrosion of ferrous metal and/or scaling of concrete by aqueous solutions of deicer salts.

The water soluble dihydrogen phosphate may be prepared by equimolar quantities of NaOH, KOH, NH$_4$OH and H$_3$PO$_4$ or superphosphoric acid or the acid and alkaline salts of Na$^{30}$, K$^+$ or NH$_4^+$ such as carbonates and acetates in such ratios that a dihydrogen phosphate is formed.

Water soluble magnesium salts such as MgCl$_2$+YH$_2$O, MgSO$_4$·YH$_2$O, and mixtures thereof where X = 0 to 6 and Y = 0 to 7 are added to the composition in an amount effective to aid the dihydrogen orthophosphate in reducing the corrosion of the highly corrosive NaCl. One or more water soluble magnesium salts may be used, but their total amount should not exceed about 9 weight percent of the deicing composition. For best results the amount of magnesium ion should be in molar amount that is about equal to the amount of phosphate ion provided by aqueous solutions of the deicing composition.

The final deicing composition of the present invention is provided by blending the NaCl, the water soluble magnesium salt, and water soluble orthophosphate by combining the compounds in the desired weight ratio and blending them until a substantially homogeneous solid mixture is obtained.

The resultant mixture which comprises the deicing composition is applied to a structure coated with ice or snow by any suitable means, such as by mechanical spreading. The deicing composition of the present invention can also be combined with conventional materials intended to increase traction, such as sand, gravel, and the like.

The following examples further illustrate various features of the present invention but are intended to in no way limit the scope of the invention which is set forth in the appended claims.

EXAMPLE 1

The corrosivity of various deicers was measured by an alternate immersion corrosion test involving the use of 2"×3" S.A.E. 1010 carbon steel panels which were degreased in hexane and dried after a methanol rinse. The steel panels had a $\frac{1}{4}$" diameter hole drilled in the center and near the top of the 2" side. The panels had numbers stamped in each of them. All panels were weighed to the nearest tenth of a milligram after drying. Three percent by dry weight basis of deicer solutions were prepared in all cases except for plain water. Four panels were suspended by a rod pushed through the $\frac{1}{4}$" holes and separated by segments of rubber tubing. Each assembly was suspended in the water or 3% deicer solutions such that the panels were $\frac{1}{2}$ immersed. During two 1 hour periods each work day the panels were suspended in air to achieve good contact with oxygen. The other 22 hours of each work day the panels were $\frac{1}{2}$ immersed. Over weekends, panels were $\frac{1}{2}$ immersed. At the end of each week, old solution was removed and replaced with new solution of the same type. At the end of one month the panels were removed and the solutions cleaned with 1820 g hot water, 180 g of concentrated hydrochloric acid and 2 g of Rodine 213. The panels were weighed and the percent protection against salt induced corrosion was calculated as follows:

% Protection Against Salt* Induced Corrosion =

$$100 \times 1 - \frac{\text{Avg Wt Loss in Test Sol'n-Avg Wt Loss in Water-Avg Cleaning Wt Loss}}{\text{Avg Wt Loss in Salt Sol'n-Avg Wt Loss in Water-Avg Cleaning Wt Loss}}$$

*NaCl

| 3% Solution Of | Percent Protection Against Salt Induced Corrosion |
|---|---|
| Water | 100.0 |
| Sodium chloride | 0.0 |
| 75.0% NaCl 21.9% Magnesium Chloride Hexahydrate 3.1% Sodium Dihydrogen Phosphate | 116.9 |
| 96.6% NaCl 3.4% Sodium Dihydrogen Phosphate Monohydrate | 62.4 |
| 98.3% NaCl 1.7% Sodium Dihydrogen Phosphate Monohydrate | 53.5 |
| 95.0% NaCl 5.0% Mono Ammonium Phosphate | 90.8 |
| 90.0% NaCl 10.0% Mono Ammonium Phosphate | 103.2 |
| 95.0% NaCl 5.0% Mono Ammonium Phosphate | 91.5 |
| 97.0% NaCl 3.0% Mono Ammonium Phosphate | 68.2 |
| 92% NaCl 5% Magnesium Chloride Hexahydrate, 3% Sodium Dihydrogen Phosphate Monohydrate | 97.6 |

The above tests in this example indicate that low levels of magnesium chloride allow for good corrosion protection when combined with salt and dihydrogen orthophosphate sales.

EXAMPLE II

Antiscaling Tests

Many deicers including salt and calcium chloride are deleterious to concrete. An ASTM procedure is established for determining the deterioration of concrete caused by deicing chemicals. In this procedure concrete is made to a predetermined slump, allowed to cure for 28 days, followed by being put into contact with either plain water or 5% deicer solutions. The samples are then cycled through freezing and thawing. In this work the cycling was done in a 24 hour period. Here, the sample was frozen for 16 hours and thawed for 8 hours. At the end of each week, the liquid was carefully decanted off the concrete and new liquid of the same type replaced. In this example the test was continued for 1 month. At the end of the freeze thaw cycle period the scaled concrete was rinsed from each beaker through filter paper. The material collected on the paper was further rinsed with water to remove any soluble salts. Next, the samples were dried in an oven and since each solution type was done in duplicate the weight of the two samples was averaged. The percent protection against salt-caused scaling was calculated in the same way as percent protection against salt causes corrosion except that no factor was put in for a cleaning loss. The results of such a test are given below:

| 3% Solution Of | Percent Protection Against Concrete Scaling |
|---|---|
| Water | 100.0 |

| 3% Solution Of | Percent Protection Against Concrete Scaling |
|---|---|
| NaCl | 0.0 |
| 92% NaCl<br>5% $MgCl_2.6H_2O$<br>3% $NaH_2PO_4.H_2O$ | 93.3 |

EXAMPLE III

Melt Tests

Melting rate tests were performed by uniformly spreading deicer of the same particle size over 8"×8" trays containing 400.0 grams of ice at 15.F. Twenty minutes later this ice was removed from the freezer and the melt poured off for exactly 1.0 minutes. The melt was weighed in each case. The rate of melting was compared by dividing the weight of melt for any deicer by the weight of melt produced by salt (sodium chloride).

| Deicer | Deicing Rate (Number of Times Faster than Pure NaCl) |
|---|---|
| 1. NaCl | 1.0 |
| 2. 92% NaCl<br>5% $MgCl_2.6H_2O$<br>3% $NaH_2PO_4.H_2O$ | 1.15 |

What is claimed is:

1. A deicing composition comprising NaCl in an amount effective for deicing and a water soluble dihydrogen orthophosphate in an amount effective for the reduction of corrosion of ferrous metal by an aqueous solution of NaCl and a water soluble magnesium salt in amount effective to aid the dihydrogen orthophosphate in the reduction of corrosion of ferrous metal by the aqueous solution of NaCl, wherein the dihydrogen orthophosphate is selected from the group consisting of $NaH_2PO_4$, $KH_2PO_4$, $(NH_4)H_2PO_4$, hydrated forms of the dihydrogen orthophosphate and mixtures thereof.

2. A deicing composition as recited in claim 1 wherein the sodium chloride comprises at least about 90 weight percent of the deicing composition and the dihydrogen orthophosphate comprises about 1 to about 10 weight percent of the deicing composition.

3. A deicing composition as recited in claim 2 wherein the NaCl comprises from about 90 to about 98 weight percent of the deicing composition and the dihydrogen orthophosphate comprises about 2 to about 10 weight percent of the deicing composition.

4. A deicing composition as recited in claims 1, 2 or 3 wherein the water soluble magnesium salt is selected from the group consisting of $MgCl_2.XH_2O$, $MgSC_4.YH_2O$ and mixtures thereof where X = 0 to 6, Y = 0 to 7 and said water soluble magnesium salt comprises not more than 9 weight percent of the deicing composition.

5. A deicing composition as recited in claims 1, 2 or 3 wherein the water soluble magnesium salt is in an amount effective to provide magnesium ions in a molar amount that is about equal to the amount of phosphate ions when the deicing composition is in solution.

6. A deicing composition as recited in claim 2 wherein the dihydrogen orthophosphate is $NaH_2PO_4$ and hydrated forms thereof.

7. A deicing composition as recited in claim 2 wherein the dihydrogen orthophosophaste is $KH_2PO_4$ and hydrated forms thereof.

8. A deicing composition as recited in claim 2 wherein the dihydrogen orthophosphate is $(NH_4)H_2PO_4$ and hydrated forms thereof.

9. A deicing composition consisting essentially of from about 90 to about 98 weight percent NaCl, from about 2 to about 10 weight percent of a dihydrogen orthophosphate selected from the group consisting of $NaH_2PO_2$, $KH_2PO_4$, $(NH_4)H_2PO_4$, hydroated forms of the dihydrogen orthophosphate and mixtures thereof, and a water soluble magnesium salt in an amount effective to aid the dihydrogen orthophosphate in the reduction of corrosion of ferrous metal by the NaCl in the composition and wherein the water soluble magnesium salt does not exceed about 9 weight percent of the deicing composition.

10. A deicing composition as recited in claim 9 wherein the water soluble magnesium salt is in an amount effective to provide magnesium ions in a molar amount that is about equal to the amount of phosphate ions when the deicing composition is in solution.

11. A deicing composition as recited in claim 9 or 10 wherein the water soluble magnesium salt is selected from the group consisting of $MgCl_219$ $XH_2O$, $MgSO_4.YH_2O$ and mixtures thereof where X = 0 to 6 and Y = 0 to 7.

12. A deicing composition as recited in claim 9 or 10 wherein the dihydrogen orthophosphate is $NaH_2PO_4$ and hydrated forms thereof.

13. A deicing composition as recited in claim 9 or 10 wherein the dihydrogen orthophosphate is $KH_2PO_4$ and hydrated forms thereof.

14. A deicing composition as recited in claim 9 or 10 wherein the dihydrogen orthophosphate is $(NH_4)H_2PO_4$ and hydrated forms thereof.

15. A deicing composition comprising NaCl in an amount effective deicing and a water soluble dihydrogen orthophosphate in an amount effective for the reduction of corrosion of ferrous metal by an aqueous soltuion of NaCl and a water soluble magnesium salt selected from the group consisting of $MgCl_2.XH_2O$, $MgSO_4.YH_2O$ and mixtures thereof in amount effective to aid the dihydrogen orthophosphate in the reduction of corrosion of ferrous metal by the aqueous solution of NaCl, wherein the dihydrogen orthophosphate is selected from the group consisting of $NaH_2PO_4$, $KH_4PO_4$, $(NH_4)H_2PO_4$, hydrated forms of the dihydrogen orthophosphate and mixtures thereof and wherein the water soluble magnesium salt comprises not more than about 9 weight percent of the deicing composition and where X = 0 to 6 and Y = 0 to 7.

16. A deicing composition as recited in claim 15 wherein the composition comprises from about 90 to 98 weight percent NaCl, from about 2 to about 10 weight percent dihydrogen orthophosphate and wherein the water soluble magnesium salt is in an amount effective to provide magnesium ions in a molar amount that is about equal to the amount of phosphate ions when the deicing composition is in solution.

* * * * *